United States Patent
AlAmmouri et al.

(10) Patent No.: US 12,069,710 B2
(45) Date of Patent: Aug. 20, 2024

(54) METHOD AND APPARATUS OF BEAM MANAGEMENT WITH MEASUREMENT AGING

(71) Applicant: Samsung Electronics Co., Ltd., Suwon-si (KR)

(72) Inventors: Ahmad AlAmmouri, Garland, TX (US); Jianhua Mo, Allen, TX (US); Vutha Va, Plano, TX (US); Boon Loong Ng, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 199 days.

(21) Appl. No.: 17/589,702

(22) Filed: Jan. 31, 2022

(65) Prior Publication Data
US 2023/0042556 A1   Feb. 9, 2023

Related U.S. Application Data

(60) Provisional application No. 63/230,487, filed on Aug. 6, 2021.

(51) Int. Cl.
*H04W 72/54* (2023.01)
*H04W 72/044* (2023.01)
*H04W 72/542* (2023.01)

(52) U.S. Cl.
CPC ....... *H04W 72/542* (2023.01); *H04W 72/044* (2013.01)

(58) Field of Classification Search
CPC .......................... H04W 72/542; H04W 72/044
See application file for complete search history.

(56) References Cited

U.S. PATENT DOCUMENTS

| | | | |
|---|---|---|---|
| 10,349,330 B2 | 7/2019 | Guerreiro et al. | |
| 10,530,456 B2 | 1/2020 | Ng et al. | |
| 10,784,947 B2 | 9/2020 | Tang et al. | |
| 2019/0253128 A1 | 8/2019 | Moon et al. | |
| 2020/0313748 A1* | 10/2020 | Padhy | H04B 7/088 |
| 2020/0404644 A1 | 12/2020 | Zhu et al. | |
| 2021/0068123 A1 | 3/2021 | Zhu et al. | |
| 2021/0109145 A1 | 4/2021 | Haustein et al. | |

(Continued)

FOREIGN PATENT DOCUMENTS

WO   2021118418 A1   6/2021

OTHER PUBLICATIONS

International Search Report and Written Opinion issued Aug. 22, 2022 regarding International Application No. PCT/KR2022/006788, 7 pages.

(Continued)

*Primary Examiner* — Curtis B Odom

(57) ABSTRACT

A method for operating an electronic device comprises obtaining information about signal quality measurements associated with a channel; generating newly obtained signal quality measurements based on a beam-sweeping procedure, wherein each signal quality measurement is associated with a respective measurement time and a respective transmit beam; adjusting the newly obtained signal quality measurements based on the measurement times and positional information of the electronic device; and updating a first measurement database of signal quality measurements with the adjusted signal quality measurements.

20 Claims, 13 Drawing Sheets

(56) References Cited

U.S. PATENT DOCUMENTS

2021/0136600 A1  5/2021  Le et al.
2021/0152233 A1  5/2021  Pan et al.
2021/0160706 A1  5/2021  Wu et al.
2021/0167875 A1  6/2021  Shen et al.

OTHER PUBLICATIONS

Extended European Search Report issued Jun. 26, 2024 regarding Application No. 22853234.7, 9 pages.

* cited by examiner

METHOD AND APPARATUS OF BEAM MANAGEMENT WITH MEASUREMENT AGING

CROSS-REFERENCE TO RELATED APPLICATIONS AND CLAIM OF PRIORITY

The present application claims priority to U.S. Provisional Patent Application No. 63/230,487, filed on Aug. 6, 2021. The content of the above-identified patent document is incorporated herein by reference.

TECHNICAL FIELD

The present disclosure relates generally to wireless communication systems and more specifically to a method and apparatus of beam management with measurement aging.

BACKGROUND

Beamforming plays an important role in mmWave communications since it yields high channel gain which is needed to achieve high data rates. However, to have successful beamforming (aka beam alignment), both the transmitting and receiving nodes have to coordinate to determine the best transmit and receive beams to use. To this end, the communication channel between the different transmit and receive antennas has to be measured periodically. While there are many ways to measure the channel, the most practical one, which is adopted in 3GPP standards, is beam sweeping.

SUMMARY

Embodiments of the present disclosure provide methods and apparatuses for channel and interference measurement.

In one embodiment, a method for operating an electronic device comprises obtaining information about signal quality measurements associated with a channel; generating newly obtained signal quality measurements based on a beam-sweeping procedure, wherein each signal quality measurement is associated with a respective measurement time and a respective transmit beam; adjusting the newly obtained signal quality measurements based on the measurement times and positional information of the electronic device; and updating a first measurement database of signal quality measurements with the adjusted signal quality measurements.

In another embodiment, an electronic device comprises: a transceiver configured to obtain information about signal quality measurements associated with a channel. The electronic device further includes a processor operably coupled to the transceiver. The processor, based on the information, is configured to: generate newly obtained signal quality measurements based on a beam-sweeping procedure, wherein each signal quality measurement is associated with a respective measurement time and a respective transmit beam; adjust the newly obtained signal quality measurements based on the measurement times and positional information of the electronic device; and update a first measurement database of signal quality measurements with the adjusted signal quality measurements.

In yet another embodiment, a computer readable medium comprises instructions that, when executed by a processor, cause the processor to: obtain information about signal quality measurements associated with a channel; generate newly obtained signal quality measurements based on a beam-sweeping procedure, wherein each signal quality measurement is associated with a respective measurement time and a respective transmit beam; adjust the newly obtained signal quality measurements based on the measurement times and positional information of the electronic device; and update a first measurement database of signal quality measurements with the adjusted signal quality measurements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
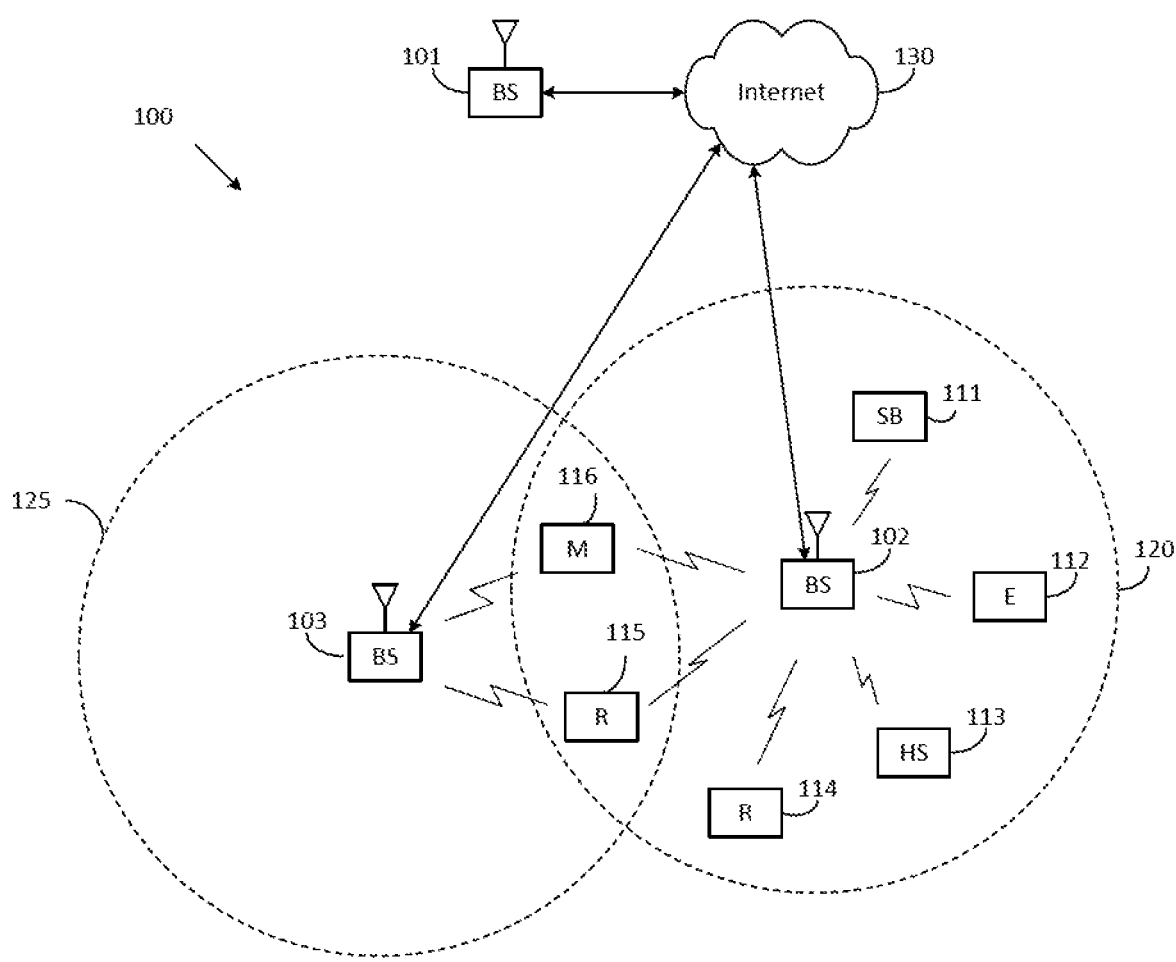
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 2:
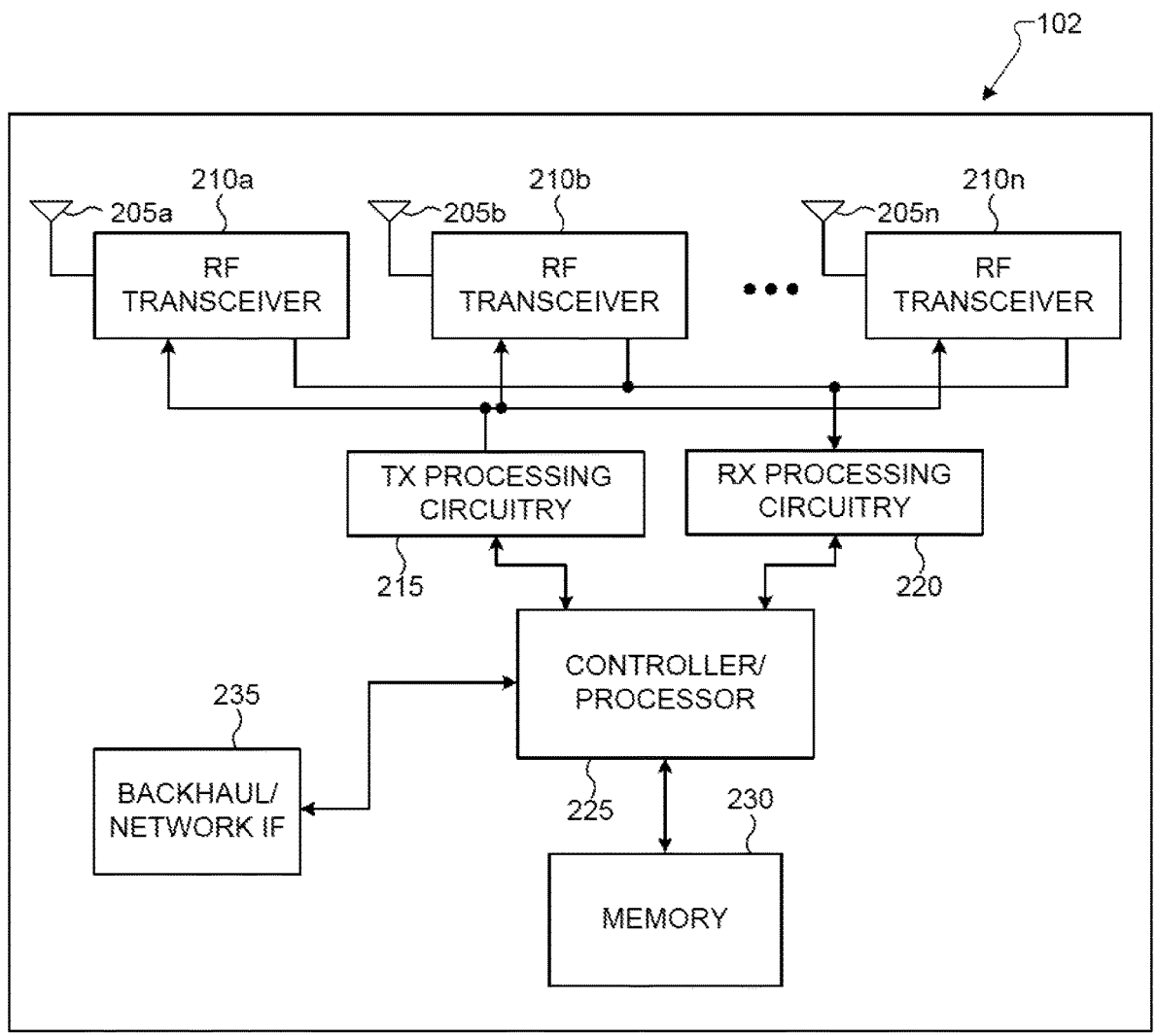
FIG. 2 illustrates an example gNB according to embodiments of the present disclosure.
Figure 3:
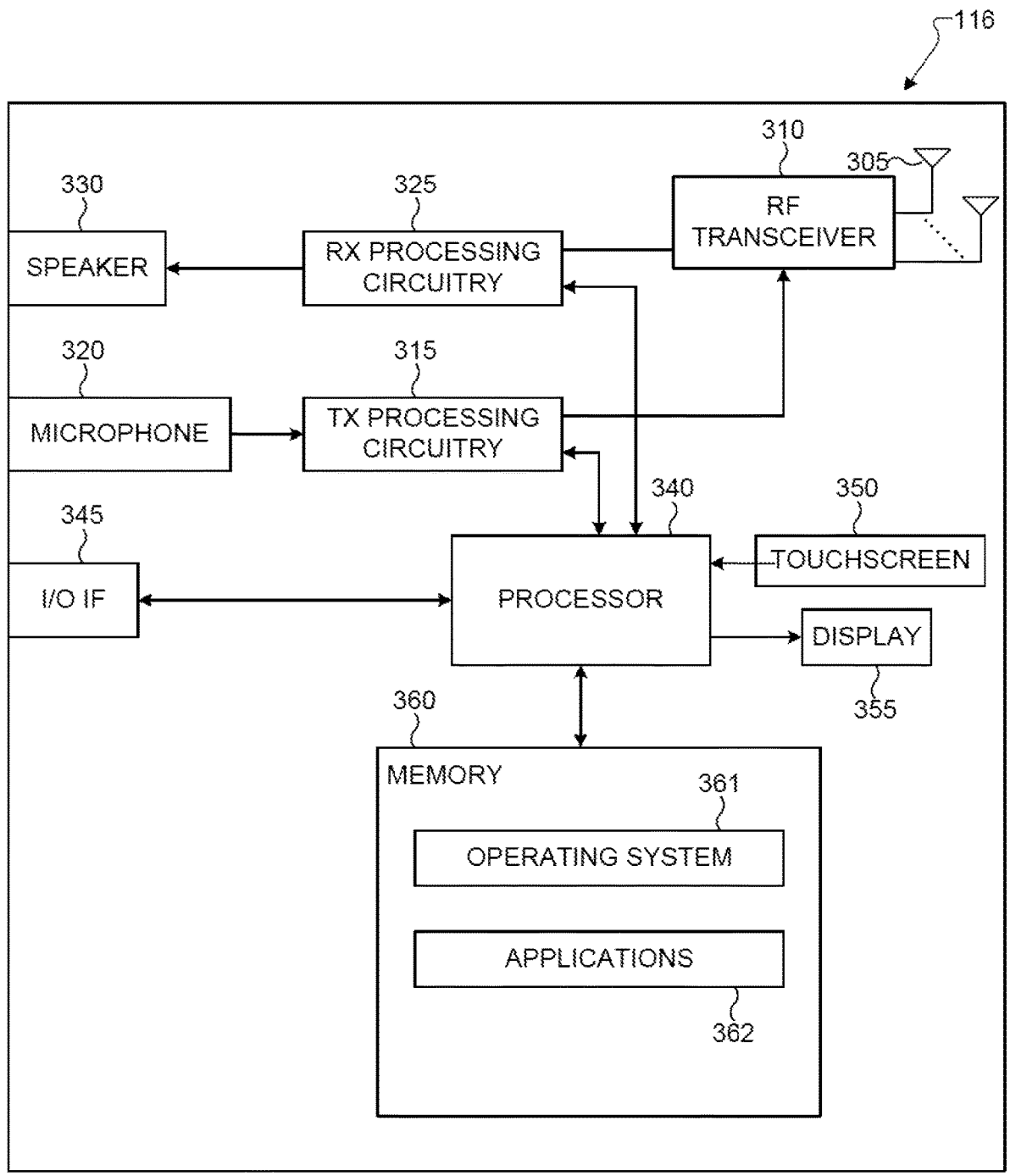
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for obtaining information about signal quality measurements associated with a channel; generating newly obtained signal quality measurements based on a beam-sweeping procedure, wherein each signal quality measurement is associated with a respective measurement time and a respective transmit beam; adjusting the newly obtained signal quality measurements based on the measurement times and positional information of the electronic device; and updating a first measurement database of signal quality measurements with the adjusted signal quality measurements.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for obtaining information about signal quality measurements associated with a channel; generating newly obtained signal quality measurements based on a beam-sweeping procedure, wherein each signal quality measurement is associated with a respective measurement time and a respective transmit beam; adjusting the newly obtained signal quality measurements based on the measurement times and positional information of the electronic device; and updating a first measurement database of signal quality measurements with the adjusted signal quality measurements. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
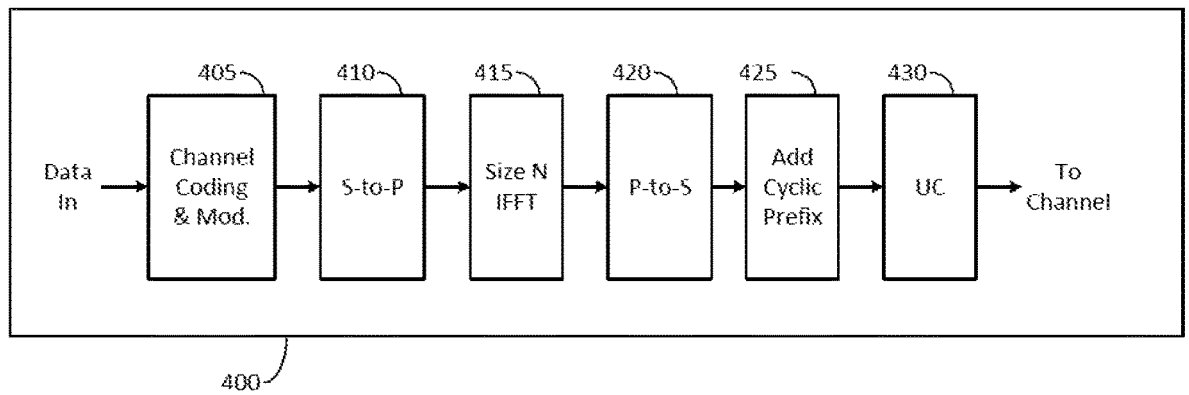
FIG. 4A illustrates a high-level diagram of an orthogonal frequency division multiple access transmit path according to embodiments of the present disclosure.
Figure 4B:
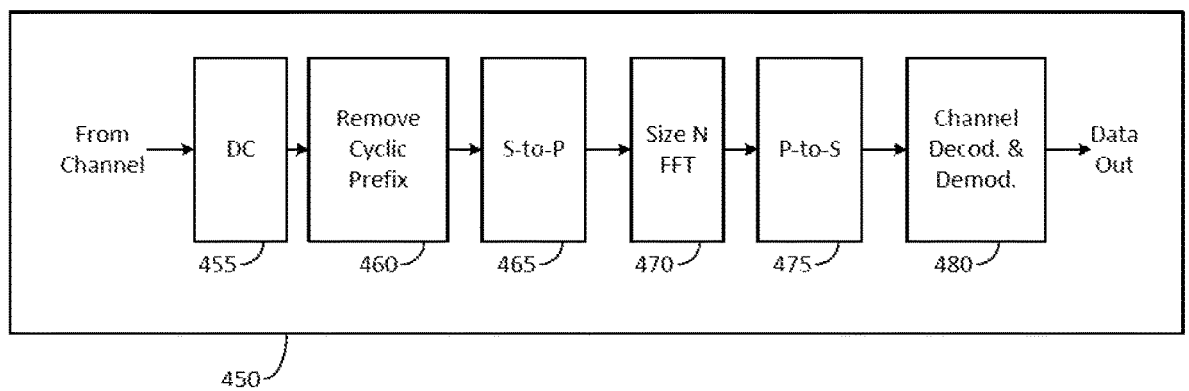
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
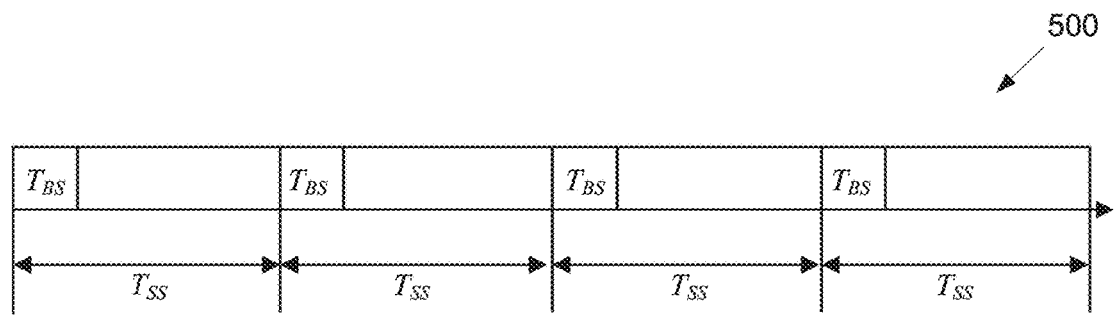
FIG. 5 illustrates data frames in 5G NR according to embodiments of the present disclosure.

FIG. 5 illustrates data frames 500 in 5G NR according to embodiments of the present disclosure. The embodiment of the data frames 500 illustrated in FIG. 5 is for illustration only. FIG. 5 does not limit the scope of this disclosure to any particular implementation of the data frames 500.

Beam sweeping generally refers to the process of which the gNB and/or the UE has a set of predefined beams that it cycles through to determine the best beam to use. For the sake of simplicity, assume a single antenna UE and a gNB with N predefined beams. Hence, to determine the best beam to use, the gNB sweeps through the N beams, transmitting a reference signal using one beam at a time, while the UE measures the reference signal received power (RSRP) for each of the beams. Once the gNB finishes beam sweeping, the UE reports the measurements back to the gNB. At this point, the gNB can pick the beam with the highest RSRP to transmit data to the UE. However, due to the nature of wireless channels, these channels remain roughly constant for a limited period of time, and the whole beam sweeping process has to be repeated again once these measurements are outdated. For example, in the 3GPP 5G NR standard, this process is done every synchronization signal burst (SSB) period, denoted hereafter by $T_{SS}$, which could be 5, 10, 20, 40, 80, or 160 ms. Every $T_{SS}$, the gNB has to determine which beam to use through beam sweeping, then use the determined beam to transmit data to the UE during the remaining time of $T_{SS}$. Hence, the overhead of beam sweeping is observed every $T_{SS}$, and ideally, minimizing this overhead while maintaining reasonably fresh measurements of the channel is desirable. Hereafter, the time used to perform beam sweeping is referred to by $T_{BS}$.

The problem becomes more complicated when the UE is also equipped with multiple antennas as well and hence, it has its own set of predefined beams, M, that need to be measured as well. More specifically, the channels between each of the N gNB beams and the M UE beams have to be measured, so in total, there are NM measurements to be made. Beam sweeping in this case is extended such that the gNB sweeps through its N beams for each of the M UE beams. After the whole process is completed, there is an N×M table at the UE side which contains the measurements for all the beams, where the (n, m) entry is the RSRP of the $n^{th}$ gNB beam and the $m^{th}$ UE beam. Based on this table, the best RSRP is picked and the respective row and column indices represent the indices of the gNB and UE beams, respectively, that should be used. More specifically, the UE report to the gNB is a K×1 (K≤N) vector containing the best RSRP the UE observed for each K gNB beams. Then the gNB picks the beam that will be used to transmit data to the UE and informs the UE of this decision. After that, the UE picks the best receiving beam, i.e., the beam with the best RSRP, to receive the data. However, due to the large number of beams in the mmWave band, measuring all of the NM channels before each transmission significantly increases the latency and overhead, and leaves less time to actually transmit the data.

Figure 6:
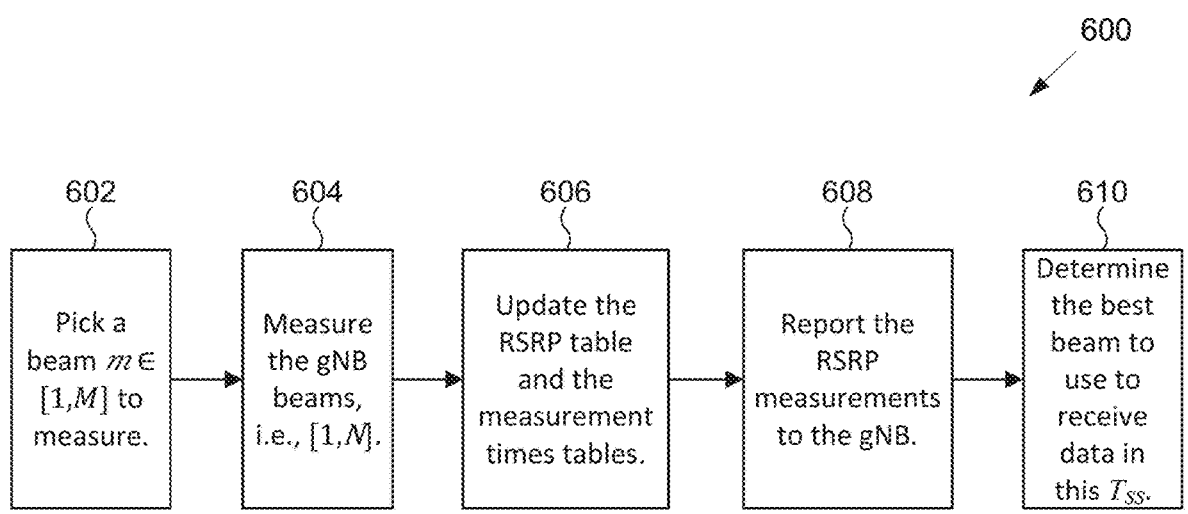
FIG. 6 illustrates a beam sweeping process according to embodiments of the present disclosure.

FIG. 6 illustrates a beam sweeping process according to embodiments of the present disclosure. The embodiment of the beam sweeping process 600 illustrated in FIG. 6 is for illustration only. FIG. 6 does not limit the scope of this disclosure to any particular implementation of the beam sweeping process 600.

To solve the aforementioned problem, only a subset of the NM channels is measured before each transmission during $T_{BS}$, and the UE relies on previous measurements for the rest of the channels to determine the best beam to use. For example, the UE can measure all of the N gNB beams with a single UE beam every $T_{SS}$, and then each $T_{SS}$, it measures the gNB beams through another one of its beams until all the M beams are measured. Then the whole process is repeated again every $MT_{SS}$. Formally, the beam sweeping process is illustrated in FIG. 4, which is repeated every $T_{SS}$.

As illustrated in FIG. 6, at 602, the UE picks one of its beams to measure the gNB beams. The simplest way to do this is to go through the M beams sequentially until all the M beams are measured, and then cycle through them again after $MT_{SS}$, seconds. At 604, the second step is determined by the serving gNB, in which the gNB transmits a reference signal on each one of its beams separately, while the UE measures the RSRP. At 606, after measuring the gNB beams, the UE updates its RSRP table, namely; the elements in the $m^{th}$ column. At 608, the UE picks the best RSRP for each of the N gNB beams and reports back to the gNB, i.e., for each n∈[1, N] or the best K out of [1, N] the UE reports the value max RSRP(n, m). Next, the gNB decides which beam to use for data transmission, and informs the UE of the choice. Lastly, at 610, the UE decides which beam it will use to receive data from the gNB based on the RSRP table. Specifically, if the gNB will use beam n to transmit data, the UE selects the beam argmax RSRP (ñ,m) to receive the data. This process is repeated every $T_{SS}$, seconds until all the UE beams are measured, then UE starts the process again.

Referring back to the process described in FIG. 6, it cab ne seen that measuring the NM channels got distributed over $MT_{SS}$, seconds instead of a single $T_{SS}$, slot, which reduces the overall latency and overheads, and leaves more time to transmit data. The drawback of this process is that the channel can change during the $MT_{SS}$, seconds. In other words, if the channel is guaranteed to remain constant over the $MT_{SS}$, seconds, then it makes no difference as to whether the channels are measured over $MT_{SS}$, seconds or $T_{SS}$, seconds, but in reality, the channel is not guaranteed to remain constant especially in the context of mmWave communications. A simple change in the environment, such as a change of the user handgrip in the case of handheld devices, can significantly change the communication channel, and hence, the optimal beams that should be used changes as well. Hence, since the UE relies on measurements taken up to $MT_{SS}$ seconds ago, it can pick a beam that yielded high gains in the past, but has very low gain at the time of the decision due to the change in the environment. Consider the following example: assume that the gNB has N beams and UE has M beams, and at time $t_0$, the UE receives a high RSRP on its m̂ beam, which happens to have a direct LOS to the gNB. However, due to a change in the user's grip on the device, this beam gets blocked afterwards, and hence, yields a very small gain. Based on UE RSRP table, this beam can still have the best RSRP, until the UE measures it again after $t_0+MT_{SS}$, seconds. During this time, the UE can suffer from very low received signal power which might lead to outage.

One solution to the outdated RSRP measurements is based on discouraging the UE from using the outdated beam measurements and modifying the RSRP table based on the measurement time, UE displacement, previous RSRP measurements, the change of orientation, and possibly the change of the user's handgrip in the case of handheld devices. Hereafter, we assume that the UE maintains three tables; 1) the RSRP table, 2) the adjustedRSRP table, and 3) the measurement timetable. The RSRP table stores the raw and unadjusted RSRP measurement results. The time of the measurements are stored in the measurement timetable. The adjustedRSRP table stores the adjusted RSRP values, as the name implies, which could be used by the UE to report to the gNB and to determine the best beam to use.

Although the disclosure describes using RSRP measurements, the UE measurements of the channel could be reference signal received quality (RSRQ), channel quality indicator (CQI), signal-to-noise-ratio (SNR), signal-to-inter-ference-noise-ratio (SINR), etc. The embodiments in this disclosure can be applied to those measurement metrics as well.

Figure 7:
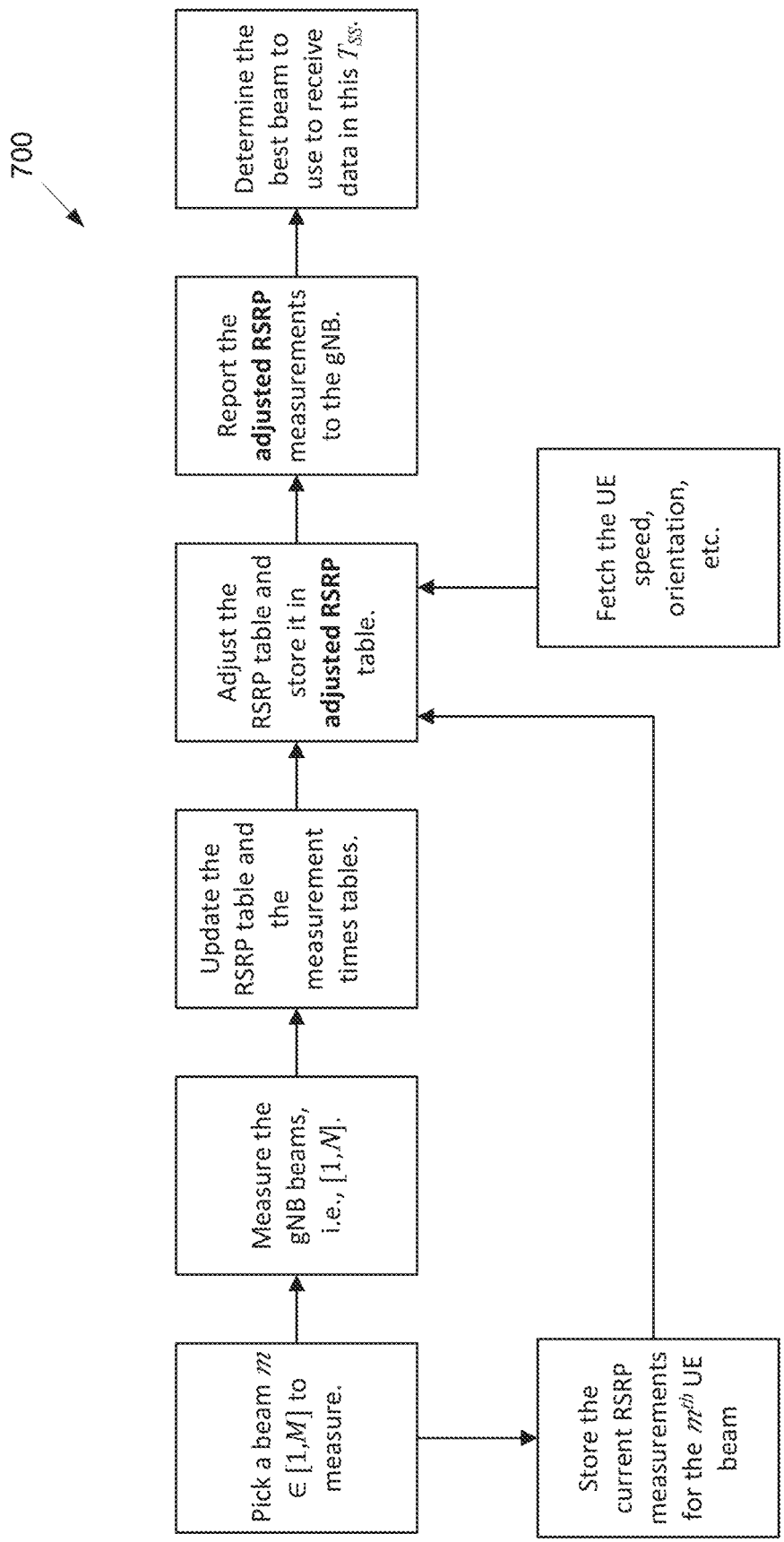
FIG. 7 illustrates another beam sweeping process according to embodiments of the present disclosure.

FIG. 7 illustrates a first embodiment of a beam sweeping process 700 according to the present disclosure. The embodiment of the beam sweeping process 700 illustrated in FIG. 7 is for illustration only. FIG. 7 does not limit the scope of this disclosure to any particular implementation of the beam sweeping process 700.

Broadly, embodiments of the beam sweeping process are focused on updating the RSRP table of the different beam combinations at the UE side by adjusting the RSRP table based on the previous measurements, UE speed, etc., and using the adjusted RSRP table to report the measurements to the gNB and to determine which beam to use to receive the data from the gNB.

Following this approach, the UE is discouraged from relying on old measurements (which could be obsolete), but will still use them if the environment has not changed much since the measurement time.

The change in the environment is captured through the change in the RSRP measurement, UE speed, UE orientation, and possibly the user's handgrip in handheld devices. Since the UE update to the gNB relies on the modified RSRP table, the gNB is also indirectly discouraged from relying on old measurements.

The main difference between the embodiment of the beam sweeping process 700 illustrated in FIG. 7 and the embodiment of the beam sweeping process 600 illustrated in FIG. 6 is that in the beam sweeping process 700, the UE adjusts the RSRP values based on the measurements' age, and any auxiliary information available; such as the UE speed, orientation, displacement, etc.

As illustrated in FIG. 7, after the RSRP table and measurement time tables are updated, the RSRP of each gNB beam n∈[1, N] and UE beam m∈[1, M] is adjusted as follows:

$$\text{adjustedRSRP}(n,m) = \text{RSRP}(n,m) - \alpha(n,m),$$

α(n, m)=F(n, m, currentRSRP, previousRSRP, UE orientation change, UE speed, UE handgrip, •••) where adjustedRSRP(•,•) and RSRP(•,•) are in dBm and α(•,•) is in dB. α(⊇⊇⊇) is a function of the auxiliary information we mentioned as follows.

- UE speed/UE displacement: UE speed and the UE displacement play the same role. The higher the speed (the longer the displacement) the higher the chance that the previous RSRP measurements are obsolete, and hence, the more the UE should be discouraged from relying on previous measurements. Note that all smart phones nowadays are equipped with GPS and accelerometers, which can be used to determine the speed and the displacement of the UE.
- UE orientation change: if the UE orientation change can be reasonably detected by the UE (for example, by inertial measurement unit (IMU)), then this information can be used to put different weights for the different beams by translating the orientation change to angular shift for the beams locally. For example, if the best current beam is pointing at the boresight direction, then if the UE detects that the orientation changed by 20 degrees to the right, then the beam pointing towards 20 degrees to the left have a high chance to be the best beam. If this is not available for the UE, then this can be done in a simpler way; the bigger the change in the orientation, the more we should penalize the old measurements.
- Measurement times: the older the measurements, the less reliable they are.
- Previous measurements: when a UE obtains a fresh measurement of a beam, it can compare it to the RSRP of the last time this beam was measured. If the gap is big, then old measurements are penalized more.
- UE handgrip: in the case of handheld devices, if the UE can sense the user's handgrip, then beams pointing towards the grip will be penalized more and the UE will be discouraged from relying on previous measurements of these beams. There are different ways to detect the user's handgrip on the device, some are direct, like using the proximity and light sensors on the device, the camera, and radar sensors. However, the grip can be predicted indirectly by knowing the app or the actively the user is using along with device orientation using its gyroscope.

Based on this, the function F(•,•••) mentioned above can take different forms depending on the information available to the UE.

Figure 8:
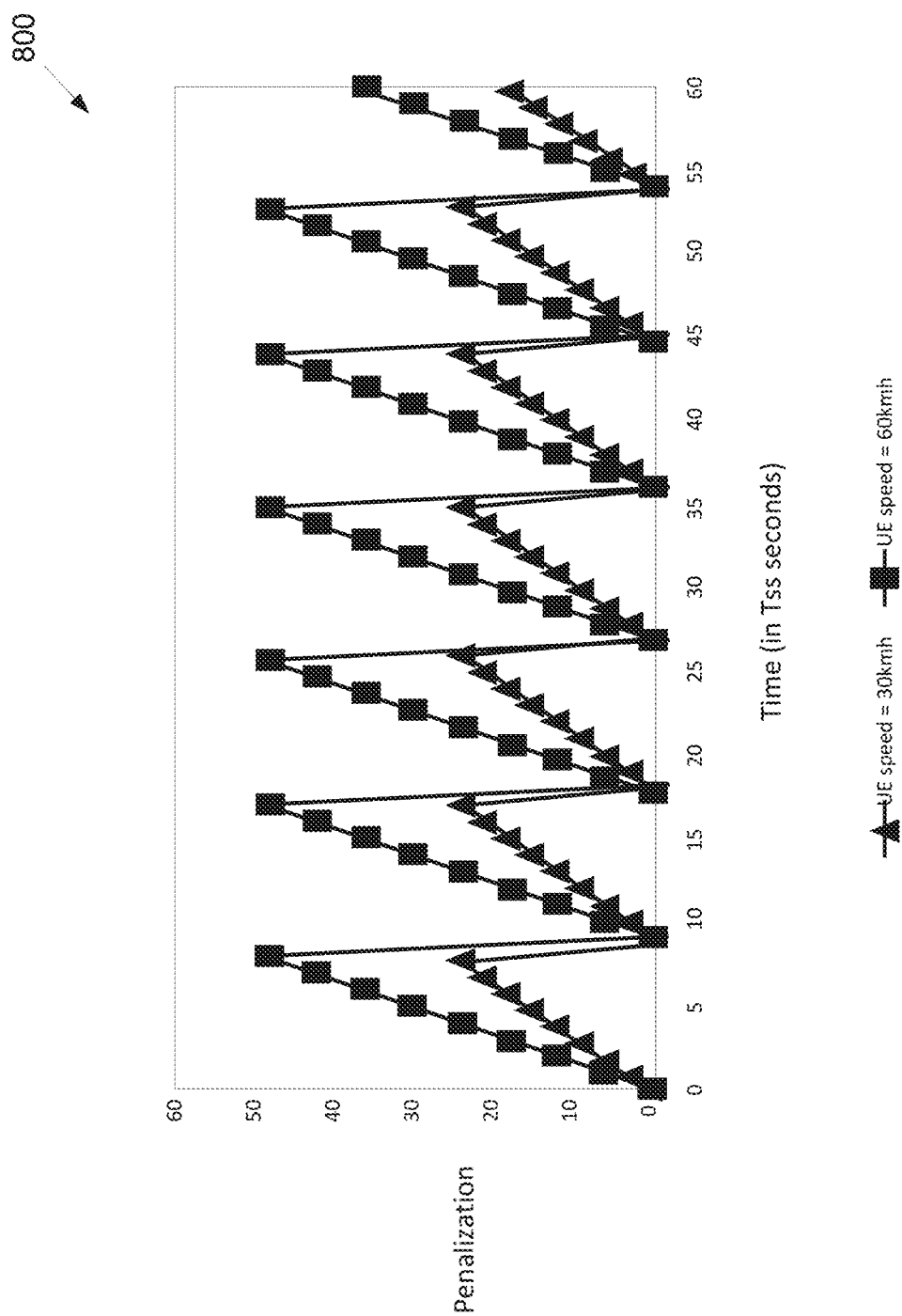
FIG. 8 illustrates a penalization factor as a function of time according to embodiments of the present disclosure.

FIG. 8 illustrates a penalization factor as a function of time 800 according to embodiments of the present disclosure. The embodiment of the penalization factor as a function of time 800 illustrated in FIG. 8 is for illustration only. FIG. 8 does not limit the scope of this disclosure to any particular implementation of the penalization factor as a function of time 800.

In one alternative, only the measurement time is taken into account, where the RSRP (in dB scale) is penalized linearly with the measurement age. Equivalently, the RSRP (in linear scale) is penalized exponentially with the measurement age. In this case, $$\alpha(n,m)=\gamma(t-\text{measurementTime}(n,m)), \quad (1)$$

where γ is a tunable parameter determining the penalization degree, (t−measurementTime(n, m)) is the measurement age. The parameter γ could be determined based on a simulation, lab experiment, or field testing.

An example is shown in FIG. 8, where it is illustrated how α changes with time for different values of γ assuming M=9. Note that the sawtooth shape is present since for any UE beam m, the channel is periodically measured every 9 $T_{SS}$ seconds, which resets the value of α to zero.

Figure 9:
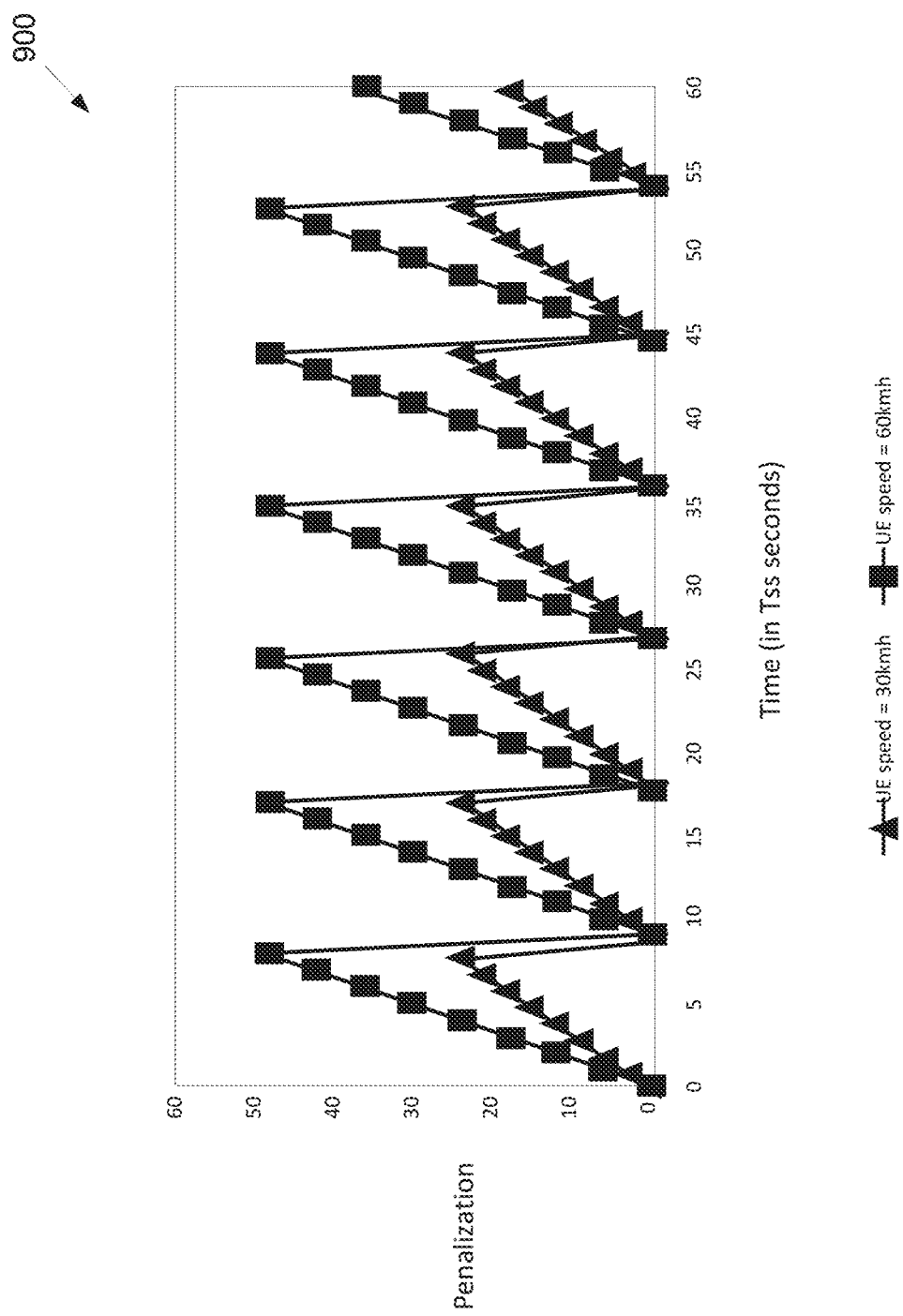
FIG. 9 illustrates a penalization factor as a function of time and device speed according to embodiments of the present disclosure.

FIG. 9 illustrates a penalization factor as a function of time and device speed 900 according to embodiments of the present disclosure. The embodiment of the penalization factor as a function of time and device speed 900 illustrated in FIG. 9 is for illustration only. FIG. 9 does not limit the scope of this disclosure to any particular implementation of the penalization factor as a function of time and device speed 900.

In another alternative, the RSRP is penalized linearly (in dB) with the UE speed. In this case, $$\alpha(n,m)=\gamma(t-\text{measurementTime}(n,m))\times \text{UESpeed}, \quad (2)$$

where UESpeed is the UE speed. An example is shown in FIG. 9, where we show how α changes with time for different UE speeds assuming M=9 and γ=1/10. Note that higher UE speed yields higher penalization factor since the environment is expected to change more rapidly, making the measurements become obsolete faster.

One issue with this form is that it does not take into account the communication environment. Another form is as follows. Assume that at time t, the UE measures the gNB beams through its m̃∈[1, M] beams. Then, the RSRP penalty is $$\alpha(n,m)=\gamma(t-\text{measurementTime}(n,m))\times \text{UESpeed}\times |\text{RSRP}(n,\tilde{m})-\text{previousRSRP}(n,\tilde{m})|, \quad (3)$$

where γ is a tunable parameter, (t−measurementTime(n, m)) is the measurement age, UESpeed is the UE speed, and the last term captures the change in the communication environment. Specifically, the last term is the change in the RSRP between the fresh measurement and the previous one for the gNB beam n and the UE beam m̃. Note that we are interested in the absolute change in the environment, whether the channel improved or degraded, since both of these cases indicate that the environment has changed and the previous measurements are less reliable. For this reason, we have the absolute value of the change in the equation. If UE speed is zero or unknown, the RSRP penalty could be $$\alpha(n,m)=\gamma(t-\text{measurementTime}(n,m))\times |\text{RSRP}(n,\tilde{m})-\text{previousRSRP}(n,\tilde{m})|, \quad (4)$$

where the penalty also takes into account the measurement times and RSRP variation.

Hence, after every fresh set of measurements, the UE adjusts the RSRP values, then reports them to the gNB and uses them to pick the beam it should use to receive the data from the gNB. Note that in the case of sequential beam search, where the UE goes through its beams sequentially, and the gNB sweeping all through its N beams every $T_{SS}$, the measurement age can be simplified to $$((lM+k)T_{SS}-\text{measurementTime}(n,m))=T_{SS}\text{mod}(M+k-m, M),$$

where t is factorized as $(lM+k)T_{SS}$, where l≥0 and 1≤k≤M are integers.

Figure 10:
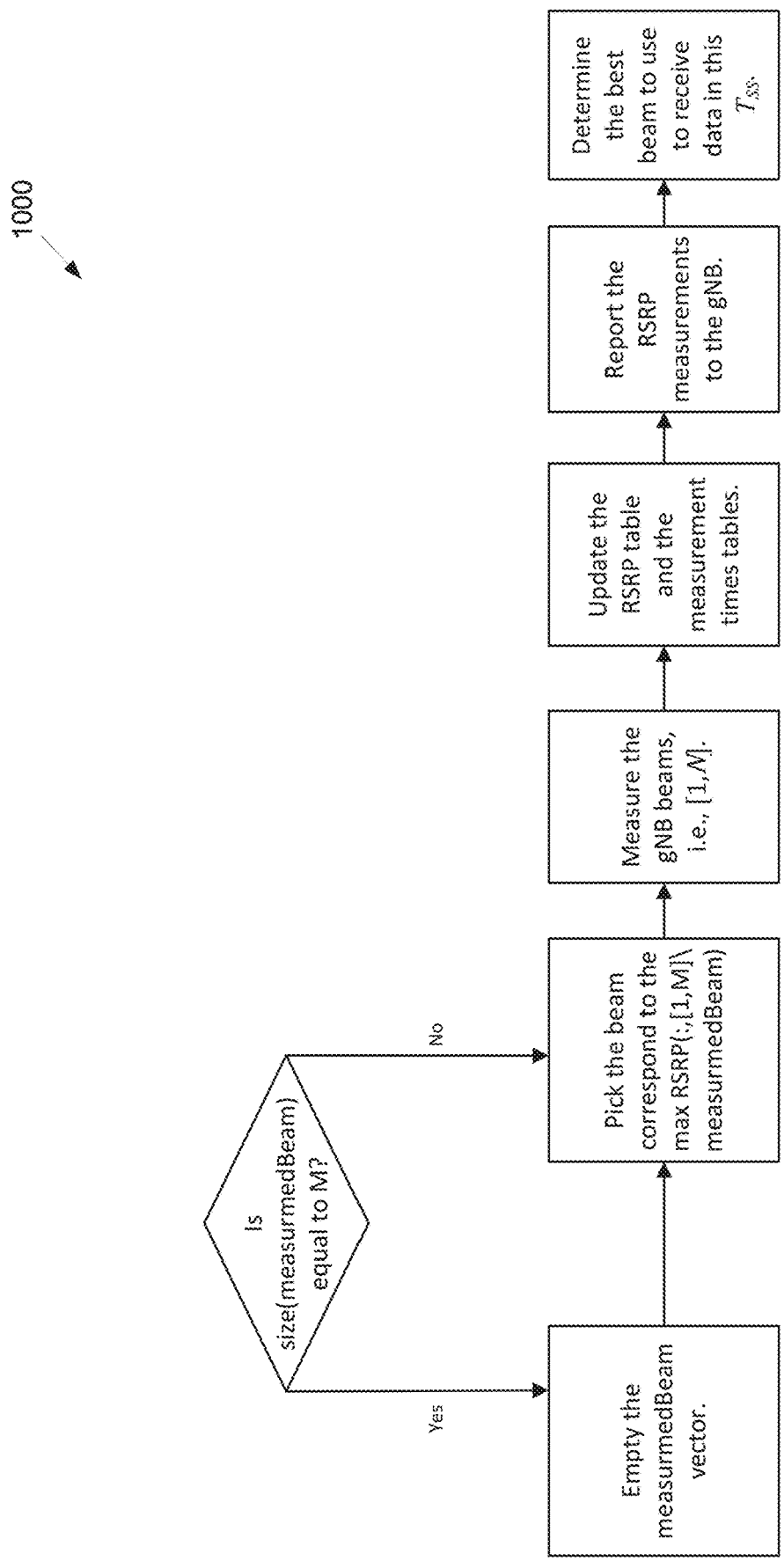
FIG. 10 illustrates another beam sweeping process according to embodiments of the present disclosure.

FIG. 10 illustrates a second embodiment of a beam sweeping process 1000 according to the present disclosure. The embodiment of the beam sweeping process 1000 illustrated in FIG. 10 is for illustration only. FIG. 10 does not limit the scope of this disclosure to any particular implementation of the beam sweeping process 1000.

In the second embodiment, the goal is also to reduce the negative effects of relying on outdated RSRP measurements.

However, different than the first embodiment discussed above, no adjustments to the RSRP table are required in this case. This could be useful in case the old measurements, UE speed, etc., are not available to the UE.

In the second embodiment, the order in which the UE sweeps through its own beams to measure the gNB beams is changed. The order may be determined by the RSRP measurements of the beams, such that the beam with the highest RSRP is first, then the beam with the second highest RSRP is second, and so on. Sweeping the beams in a descending order of RSRP measurements was chosen because the beam with the highest RSRP is likely to be used by the UE to receive the data from the gNB. Hence, the UE is encouraged to have fresh measurements of this beam to avoid the case where the beam no longer yields a high RSRP due to a change in the environment.

As illustrated in FIG. 10, a method to reduce to the impact of outdated measurements in the second embodiment is through the order in which the UE selects the beam to measure every $T_{SS}$ seconds. Hence, instead of going through the beams sequentially, or arbitrarily, the UE measures the beams with respect to their RSRP. The UE saves the measured beams in a vector called measuredBeam. At the beginning of every $MT_{SS}$ period when the measuredBeam vector is empty, the UE starts with measuring the beam that has the highest RSRP. After measuring the best beam (i.e., the beam with the highest RSRP), the UE moves to the next best beam, and so on. After measuring all the beams, the UE empties the measuredBeam vector and starts with the best beam again. The beam measurement order is based on the latest RSRP table and changes dynamically. This way, the UE is more confident that the best beam is measured first in each cycle.

Figure 11:
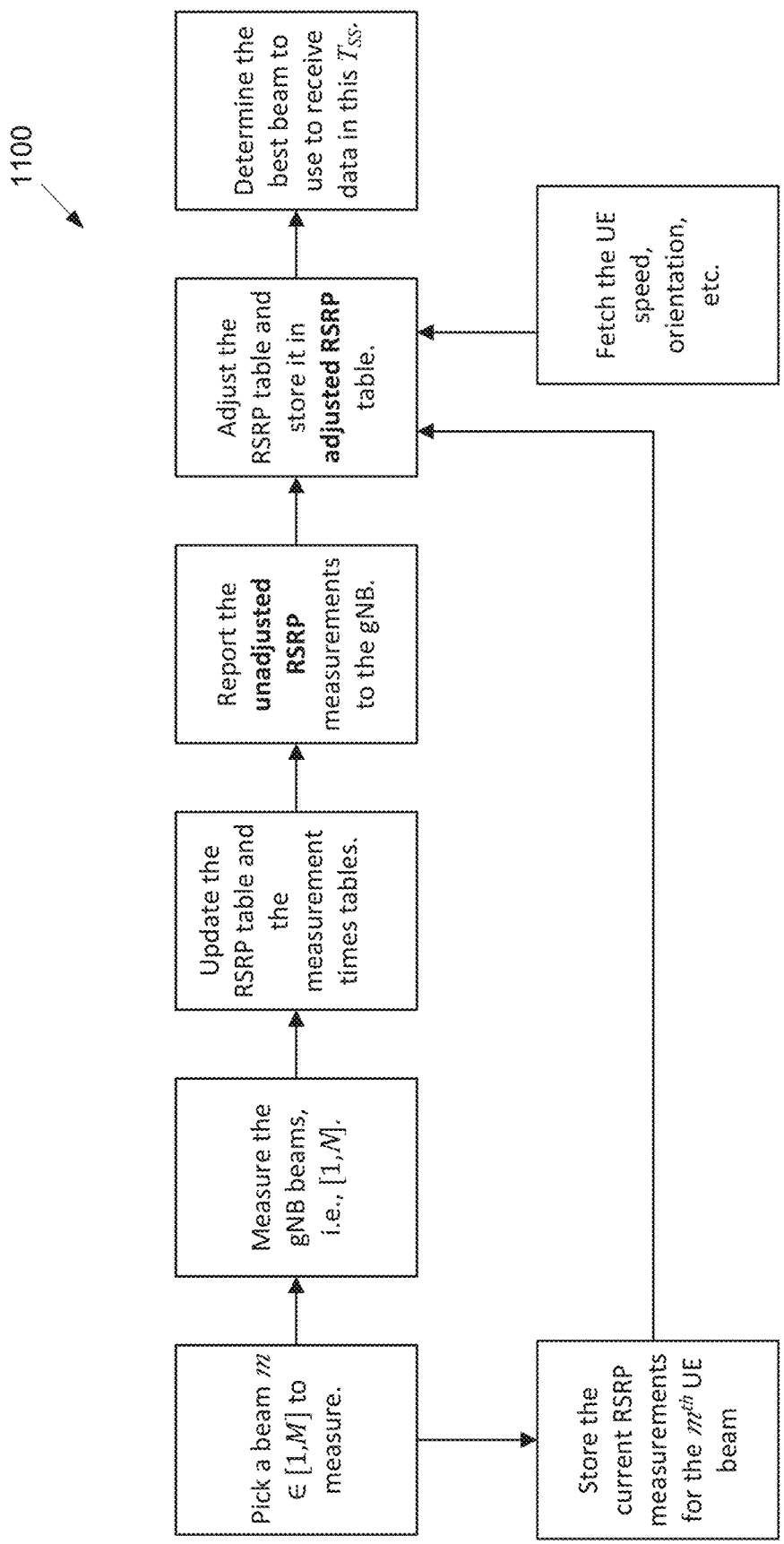
FIG. 11 illustrates yet another beam sweeping process according to embodiments of the present disclosure.

FIG. 11 illustrates a third embodiment of a beam sweeping process 1100 according to the present disclosure. The embodiment of the beam sweeping process 1100 illustrated in FIG. 11 is for illustration only. FIG. 11 does not limit the scope of this disclosure to any particular implementation of the beam sweeping process 1100.

In the third embodiment, the UE only uses the adjusted RSRP values to determine the beam used to receive the data, and not in the RSRP report to the gNB because in some scenarios, reporting the adjusted RSRP values to the gNB can cause significant number of gNB beam switches. These switches cause delays due to the extra reconfiguration between the UE and the gNB.

However, the UE still uses the adjusted RSRP table to choose which beam to use to receive the data. Note that changing the UE beam does not trigger new reconfiguration messages between the UE and the gNB. Overall, the beam switching overheads are mitigated in this case, but also the possible gain in terms of the RSRP is reduced compared to embodiment 1.

In the third embodiment, instead of reporting the adjusted RSRP to the gNB, the UE reports the unadjusted one, but uses the adjusted RSRP when deciding which UE beam to use to receive the data from the gNB beam. This embodiment is a slight variation of the first embodiment described above. Specifically, in the first embodiment, the UE report to the BS is based on the adjustedRSRP, which changes every $T_{SS}$. However, this might cause frequent changes of the gNB beams, due to the continuous change of the reported RSRP by the UE. However, the UE can report the unadjusted RSRP to the gNB, and only use the adjustedRSRP to decide which beam to use to receive the data. This has the potential of reducing the number of beam changes on the gNB side, which thus reduces the signaling overheads caused by these changes, but also reduces the overall gain compared to the first embodiment.

Figure 12:
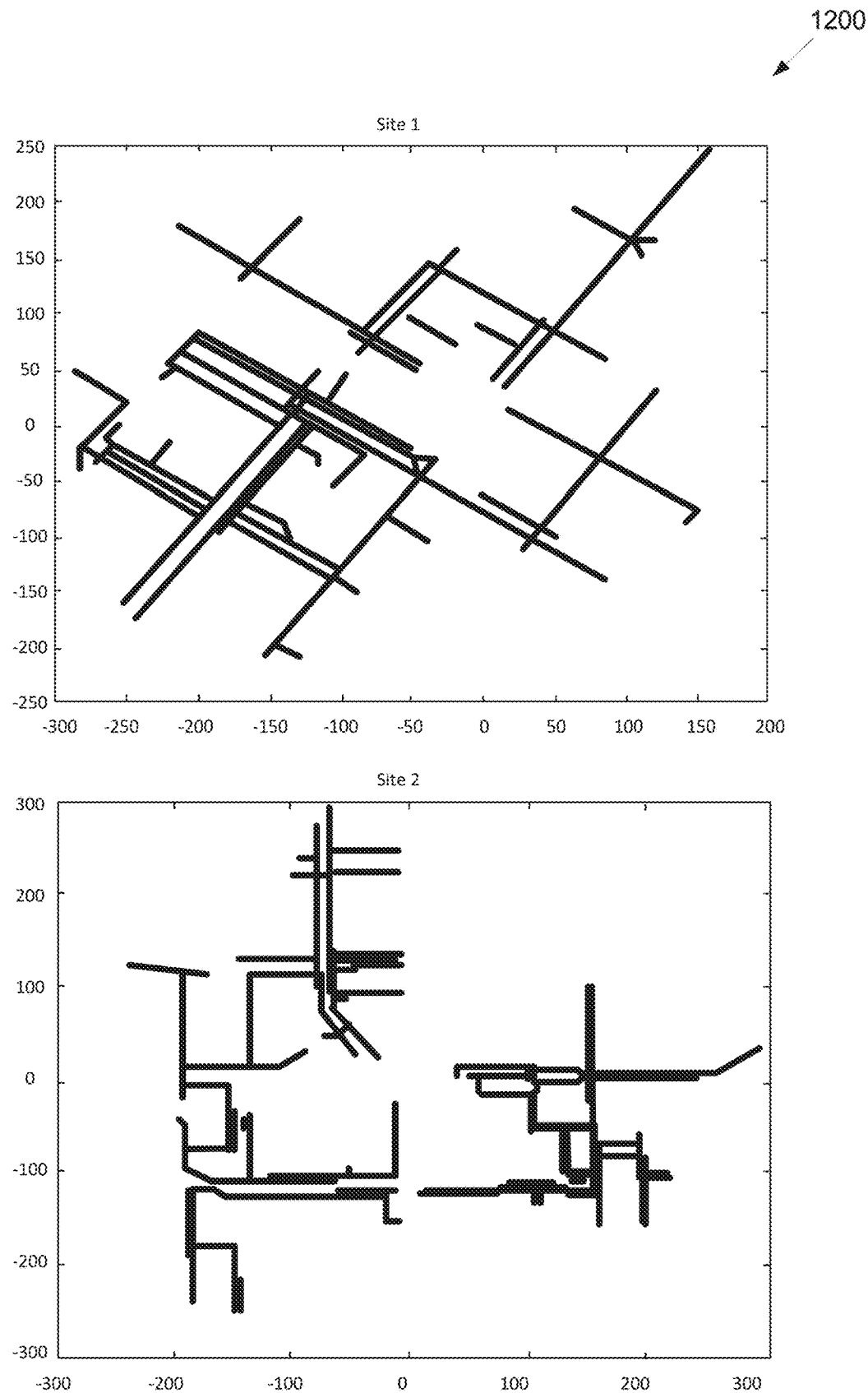
FIG. 12 illustrates a simulation of considered sites and UE trajectories according to embodiments of the present disclosure.

FIG. 12 illustrates a simulation 1200 of considered sites and UE trajectories according to embodiments of the present disclosure. The embodiment of the simulation 1200 illustrated in FIG. 12 is for illustration only. FIG. 12 does not limit the scope of this disclosure to any particular implementation of the simulation 1200.

Possible gains of the beam sweeping process 700 described above in Embodiment 1 are shown by comparing it to the beam sweeping process 600 described in FIG. 6. Two sites in Houston, TX are considered, each with three different sectors as shown in FIG. 12, where the gNB is located at the origin, and the blue lines represent the UE trajectory on the nearby streets. A raytracing tool, Wireless InSite, was used to accurately measure the wireless channels at different UE locations, and through our simulator, the RSRP values were collected for a moving UE on a trajectory of 2 km assuming two different speeds; 30 km/h and 60 km/h. Each sector has its own environment along with LOS probabilities. The gNB is assumed to use a beam codebook that has 56 narrow beams, while the UE is assumed to use a beam codebook with 9 wide band beams. The results are summarized in FIG. 13 and FIG. 14.

Figure 13:
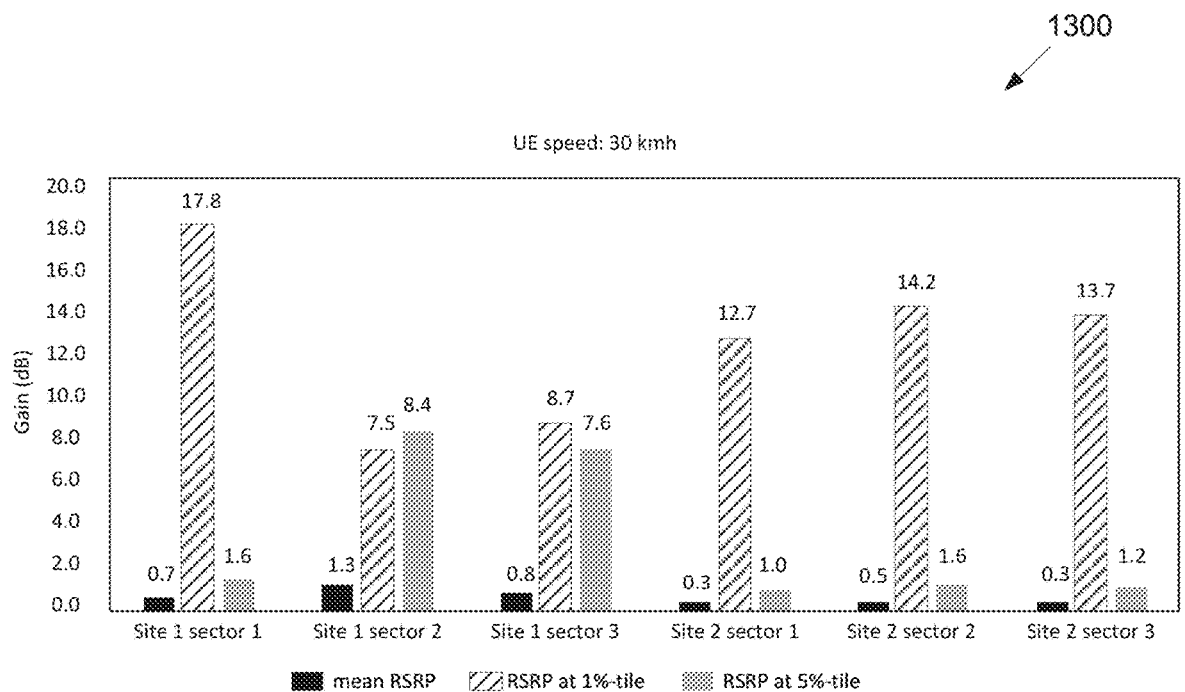
FIG. 13 illustrates an RSRP gain for 30 km/h speed according to embodiments of the present disclosure.

FIG. 13 illustrates an RSRP gain for 30 km/h speed 1300 according to embodiments of the present disclosure. The embodiment of the RSRP gain for 30 km/h speed 1300 illustrated in FIG. 13 is for illustration only. FIG. 13 does not limit the scope of this disclosure to any particular implementation of the RSRP gain for 30 km/h speed 1300.

Figure 14:
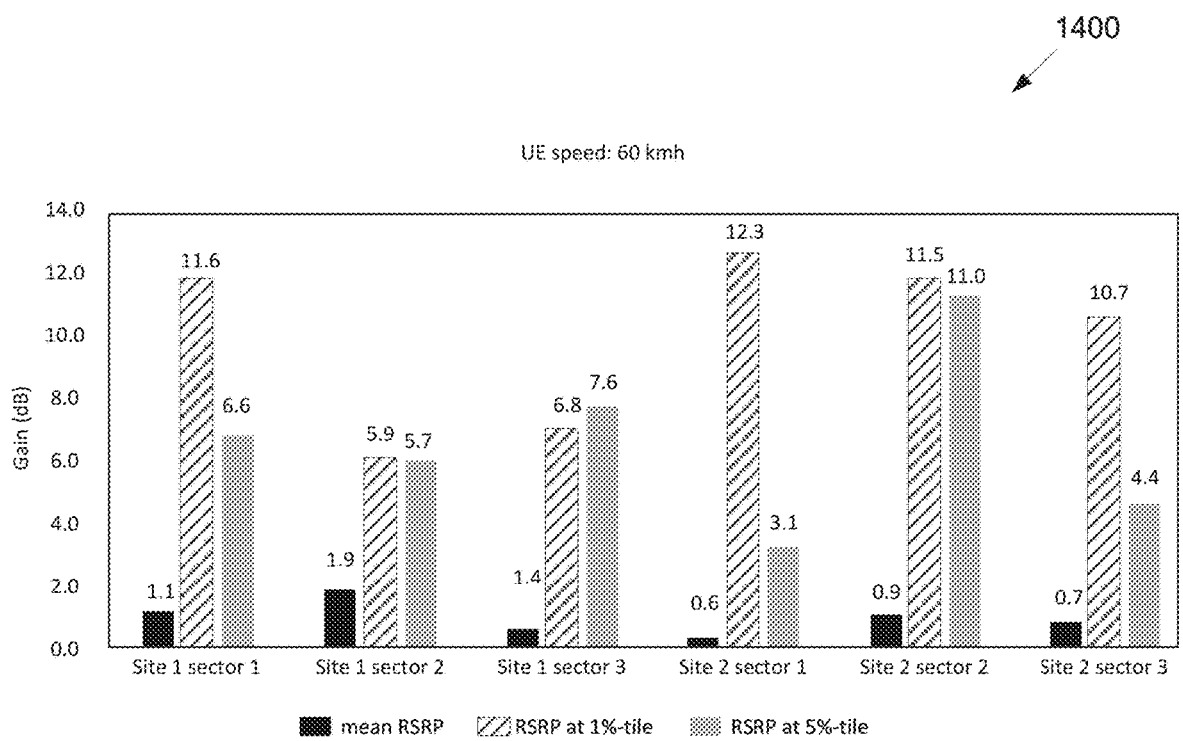
FIG. 14 illustrates an RSRP gain for 60 km/h speed according to embodiments of the present disclosure.

FIG. 14 illustrates an RSRP gain for 60 km/h speed according to embodiments of the present disclosure. The embodiment of the RSRP gain for 60 km/h speed 1400 illustrated in FIG. 14 is for illustration only. FIG. 14 does not limit the scope of this disclosure to any particular implementation of the RSRP gain for 60 km/h speed 1400.

FIG. 13 and FIG. 14 illustrate the RSRP gain determined from implementing the algorithm described by FIG. 7 and equation (3). More specifically, the gain with respect to the conventional approach in terms of the $1^{st}$ percentile, $5^{th}$ percentile, and the mean value of the RSRP for the different sectors are shown in FIG. 13 and FIG. 14. The results show a gain up to 1.3 dB (1.9) for mean RSRP, 8.4 dB (11 dB) for 5%-tile, and 17.8 dB (11.6 dB) for 1%-tile when the UE speed is set to 30 km/h (60 km/h). These significant gains for the low percentile of the RSRP are very beneficial, since they correspond to the cases where the UE suffers from a very low RSRP which might lead to an outage. Our analysis shows that the average RSRP 1%-tile across all sectors went from −123 dBm to −113 dBm assuming a UE speed of 30 kmh. Hence, having more than 10 dB push in RSRP in these cases can be the difference between being connected to the network or in outage. This region of low RSRP is also mostly due to a UE selecting a beam based on old measurement that is outdated, especially while transitioning from LOS to NLOS link. Hence, once the process is implemented, this issue can be partially avoided which leads to up to more than 10 dB in RSRP.

Any of the above variation embodiments can be utilized independently or in combination with at least one other variation embodiment.

Figure 15:
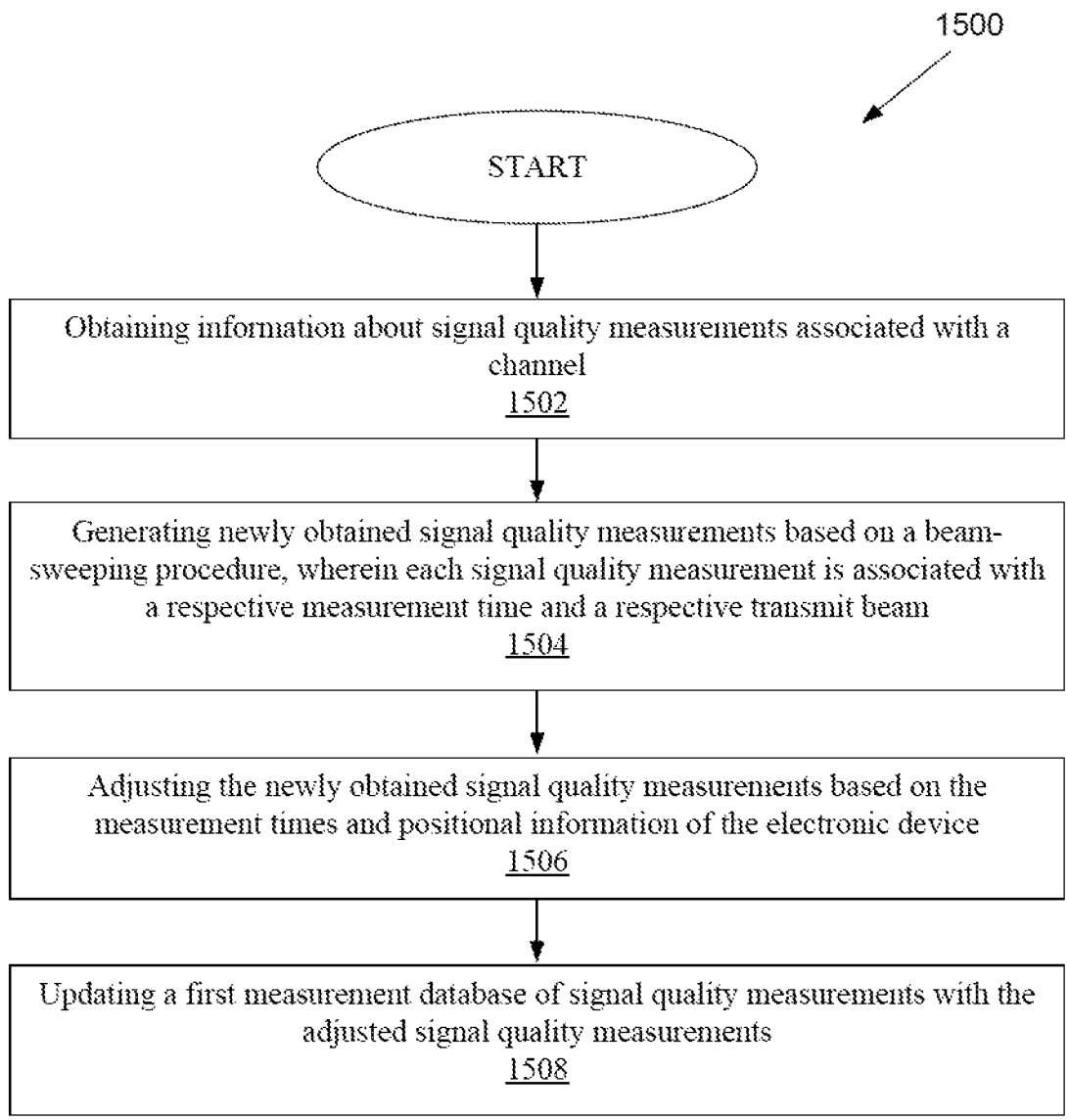
FIG. 15 illustrates a flow chart of a method for operating an electronic device according to embodiments of the present disclosure.

FIG. 15 illustrates a flow chart of a method 1500 for operating an electronic device, as may be performed by a UE such as UE 116, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the electronic device (e.g., UE 111-116 as illustrated in FIG. 1) obtains information about signal quality measurements associated with a channel.

In step 1504, the electronic device generates newly obtained signal quality measurements based on a beam-sweeping procedure, wherein each signal quality measurement is associated with a respective measurement time and a respective transmit beam.

In step 1506, the electronic device adjusts the newly obtained signal quality measurements based on the measurement times and positional information of the electronic device.

In step 1508, the electronic device updates a first measurement database of signal quality measurements with the adjusted signal quality measurements.

In one embodiment, to adjust the newly obtained signal quality measurements, the electronic device adjusts signal quality measurements of each base station beam n∈[1, N] and each user equipment beam m∈[1, M] according to an equation: adjustedRSRP(n, m)=RSRP(n, m)−α(n, m), wherein: RSRP=reference signal receive power, N and M are integers>1, and α is a function of information available to the electronic device.

In one embodiment, α(n, m) is based on a difference between a current time and a measurement time.

In one embodiment, α(n, m) is based on: a difference between a current time and a measurement time; electronic device speed; and a change in RSRP between a current measurement and a previous measurement.

In one embodiment, the electronic device reports the adjusted signal quality measurements to a base station; or reports non-adjusted signal quality measurements to the base station, wherein the non-adjusted signal quality measurements comprise previous signal quality measurements stored in a second measurement database of signal quality measurements.

In one embodiment, the electronic device determines a receiving beam based on the adjusted signal quality measurements.

In one embodiment, the electronic device determines, based on previous signal quality measurements, an order of a plurality of beams of the electronic device; performs the beam-sweeping procedure based on a descending order of the plurality of beams of the electronic device; and determines a receiving beam based on the beam-sweeping procedure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for operating an electronic device, the method comprising:
   obtaining information about signal quality measurements associated with a channel;
   generating newly obtained signal quality measurements based on a beam-sweeping procedure, wherein each signal quality measurement is associated with a respective measurement time and a respective transmit beam;
   adjusting the newly obtained signal quality measurements based on the measurement times and positional information of the electronic device; and
   updating a first measurement database of signal quality measurements with the adjusted signal quality measurements.

2. The method of claim 1, wherein adjusting the newly obtained signal quality measurements comprises adjusting signal quality measurements of each base station beam n∈[1, N] and each user equipment (UE) beam m∈[1, M] according to an equation:

$$\text{adjustedRSRP}(n,m)=\text{RSRP}(n,m)-\alpha(n,m),$$

wherein:
RSRP=reference signal receive power,
N and M are integers>1, and
α is a function of information available to the electronic device.

3. The method of claim 2, wherein α(n, m) is based on a difference between a current time and a measurement time.

4. The method of claim 2, wherein α(n, m) is based on:
a difference between a current time and a measurement time;
electronic device speed; and
a change in RSRP between a current measurement and a previous measurement.

5. The method of claim 1, further comprising:
reporting the adjusted signal quality measurements to a base station; or
reporting non-adjusted signal quality measurements to the base station, wherein the non-adjusted signal quality measurements comprise previous signal quality measurements stored in a second measurement database of signal quality measurements.

6. The method of claim 5, further comprising determining a receiving beam based on the adjusted signal quality measurements.

7. The method of claim 1, further comprising:
determining, based on previous signal quality measurements, an order of a plurality of beams of the electronic device;
performing the beam-sweeping procedure based on a descending order of the plurality of beams of the electronic device; and
determining a receiving beam based on the beam-sweeping procedure.

8. An electronic device comprising:
a transceiver configured to obtain information about signal quality measurements associated with a channel; and
a processor operably coupled to the transceiver, the processor, based on the information, configured to:
   generate newly obtained signal quality measurements based on a beam-sweeping procedure, wherein each signal quality measurement is associated with a respective measurement time and a respective transmit beam;

adjust the newly obtained signal quality measurements based on the measurement times and positional information of the electronic device; and update a first measurement database of signal quality measurements with the adjusted signal quality measurements.

9. The electronic device of claim 8, wherein to adjust the newly obtained signal quality measurements, the processor is configured to adjust signal quality measurements of each base station beam n∈[1, N] and each user equipment beam m∈[1, M] according to an equation:

adjustedRSRP(n,m)=RSRP(n,m)−α(n,m), wherein:
RSRP=reference signal receive power,
N and M are integers>1, and
α is a function of information available to the electronic device.

10. The electronic device of claim 9, wherein α(n, m) is based on a difference between a current time and a measurement time.

11. The electronic device of claim 9, wherein α(n, m) is based on:
a difference between a current time and a measurement time;
electronic device speed; and
a change in RSRP between a current measurement and a previous measurement.

12. The electronic device of claim 8, wherein the processor is further configured to:
report the adjusted signal quality measurements to a base station; or
report non-adjusted signal quality measurements to the base station, wherein the non-adjusted signal quality measurements comprise previous signal quality measurements stored in a second measurement database of signal quality measurements.

13. The electronic device of claim 12, wherein the processor is further configured to determine a receiving beam based on the adjusted signal quality measurements.

14. The electronic device of claim 8, wherein the processor is further configured to:
determine, based on previous signal quality measurements, an order of a plurality of beams of the electronic device;
perform the beam-sweeping procedure based on a descending order of the plurality of beams of the electronic device; and
determine a receiving beam based on the beam-sweeping procedure.

15. A non-transitory computer readable medium comprising instructions that, when executed by a processor, cause the processor to:
obtain information about signal quality measurements associated with a channel;
generate newly obtained signal quality measurements based on a beam-sweeping procedure, wherein each signal quality measurement is associated with a respective measurement time and a respective transmit beam;
adjust the newly obtained signal quality measurements based on the measurement times and positional information of an electronic device; and
update a first measurement database of signal quality measurements with the adjusted signal quality measurements.

16. The computer readable medium of claim 15, wherein the instructions, when executed by the processor, cause the processor to adjust signal quality measurements of each base station beam n∈[1, N] and each user equipment beam m∈[1, M] according to an equation:

adjustedRSRP(n,m)=RSRP(n,m)−α(n,m), wherein:
RSRP=reference signal receive power,
N and M are integers>1, and
α is a function of information available to the electronic device.

17. The computer readable medium of claim 16, wherein α(n, m) is based on a difference between a current time and a measurement time.

18. The computer readable medium of claim 16, wherein α(n, m) is based on:
a difference between a current time and a measurement time;
electronic device speed; and
a change in RSRP between a current measurement and a previous measurement.

19. The computer readable medium of claim 15, wherein the instructions, when executed by the processor, cause the processor to:
report the adjusted signal quality measurements to a base station; or
report non-adjusted signal quality measurements to the base station, wherein the non-adjusted signal quality measurements comprise previous signal quality measurements stored in a second measurement database of signal quality measurements.

20. The computer readable medium of claim 15, wherein the instructions, when executed by the processor, cause the processor to:
determine, based on previous signal quality measurements, an order of a plurality of beams of the electronic device;
perform the beam-sweeping procedure based on a descending order of the plurality of beams of the electronic device; and
determine a receiving beam based on the beam-sweeping procedure.

* * * * *